US012132326B2

(12) United States Patent
Yoon et al.

(10) Patent No.: US 12,132,326 B2
(45) Date of Patent: Oct. 29, 2024

(54) STORAGE CONTAINER FOR IN-VEHICLE WIRELESS TOOL CHARGING

(71) Applicant: Clarion Corporation of America, Auburn Hills, MI (US)

(72) Inventors: Ina Yoon, Clarkston, MI (US); Leslie Tuckey, South Lyon, MI (US); Adam Thomas, Commerce Township, MI (US)

(73) Assignee: Clarion Corporation of America, Auburn Hills, MI (US)

( * ) Notice: Subject to any disclaimer, the term of this patent is extended or adjusted under 35 U.S.C. 154(b) by 487 days.

(21) Appl. No.: 17/526,083

(22) Filed: Nov. 15, 2021

(65) Prior Publication Data

US 2023/0155415 A1 May 18, 2023

(51) Int. Cl.
*H02J 50/00* (2016.01)
*B25H 3/06* (2006.01)
*B60L 1/00* (2006.01)
*H02J 50/12* (2016.01)

(52) U.S. Cl.
CPC ............. *H02J 50/005* (2020.01); *B25H 3/06* (2013.01); *B60L 1/006* (2013.01); *H02J 50/12* (2016.02); *B60L 2200/36* (2013.01)

(58) Field of Classification Search
CPC .......... H02J 50/005; H02J 50/10; H02J 50/12; H02J 7/0042; H02J 7/0044; B25H 3/02; B25H 3/06; B60L 1/006; B60L 2200/36
See application file for complete search history.

(56) References Cited

U.S. PATENT DOCUMENTS

| 5,976,672 | A | * | 11/1999 | Hodgetts | ................. | B60R 13/01 |
| | | | | | | 428/116 |
| 6,571,949 | B2 | | 6/2003 | Burrus, IV | | |
| 7,462,951 | B1 | * | 12/2008 | Baarman | ............... | H02J 50/402 |
| | | | | | | 307/9.1 |
| 10,286,862 | B2 | | 5/2019 | Pike | | |
| 2014/0262922 | A1 | * | 9/2014 | Johnson | ................... | B25H 3/06 |
| | | | | | | 206/565 |
| 2014/0340034 | A1 | * | 11/2014 | Dietzel | ................... | H02J 50/10 |
| | | | | | | 320/108 |
| 2015/0191823 | A1 | * | 7/2015 | Banna | ...................... | H05B 6/02 |
| | | | | | | 219/635 |
| 2016/0009232 | A1 | * | 1/2016 | Budny | .................... | B60R 11/06 |
| | | | | | | 29/729 |
| 2022/0102995 | A1 | * | 3/2022 | Fieldbinder | ............. | H02J 50/12 |

FOREIGN PATENT DOCUMENTS

EP 3402033 A1 11/2018

* cited by examiner

*Primary Examiner* — Richard Isla
*Assistant Examiner* — Johali A Torres Ruiz
(74) *Attorney, Agent, or Firm* — Barnes & Thornburg LLP

(57) ABSTRACT

The present disclosure relates to a tool container for wirelessly charging tools that is integrated with a vehicle.

10 Claims, 5 Drawing Sheets

STORAGE CONTAINER FOR IN-VEHICLE WIRELESS TOOL CHARGING

BACKGROUND

The present disclosure relates to wireless charging of battery-powered devices. More particularly, the present disclosure relates to in-vehicle chargers for battery-powered tools.

SUMMARY

According to the present disclosure, a tool container for wirelessly charging tools comprises a wireless charging transmitter, a tool tray coupled to the wireless charging transmitter, and a tool tray liner removably coupled to the tool tray. The tool tray liner comprises a flexible brush pad.

In illustrative embodiments, the tool container comprises a tool cover coupled to the tool tray. The tool cover is moveable between a closed position and an open position. When the tool cover is in the closed position the tool tray liner and the tool cover define a charging volume configured to retain a device comprising a wireless charging receiver for charging by the wireless charging transmitter.

In illustrative embodiments, the tool container further comprises thermal conductive foam coupled to the tool cover. When the tool cover is in the closed position the thermal conductive foam and the tool tray liner define the charging volume.

In illustrative embodiments, the thermal conductive foam comprises a silicone material.

In illustrative embodiments, the tool tray liner comprises a silicone material.

In illustrative embodiments, the tool tray liner comprises a plurality of flexible fingers that extend from the tool tray toward the charging volume.

In illustrative embodiments, the tool tray liner comprises a first area positioned at a central part of the tool tray and a second area surrounding the first area. The central part of the tool tray is positioned opposite a central part of the wireless charging transmitter. The flexible fingers of the first area extend a first height from the tool tray, and the flexible fingers of the second area extend a second height from the tool tray. The second height is larger than the first height.

In illustrative embodiments, the tool tray liner comprises a third area surrounding the second area, the flexible fingers of the third area extending a third eight from the tool tray, the third height larger than the first height.

In illustrative embodiments, the wireless charging transmitter is configured to receive electrical power from a vehicle power supply.

In illustrative embodiments, the tool container is configured to be mounted to a vehicle.

In illustrative embodiments, the device comprises a wireless power tool or a rechargeable battery.

In illustrative embodiments, the wireless charging transmitter comprises a resonant charging transmitter.

In illustrative embodiments, the wireless charging transmitter comprises a first resonator having a first resonant frequency, and the wireless charging receiver comprises a second resonator having the first resonant frequency.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
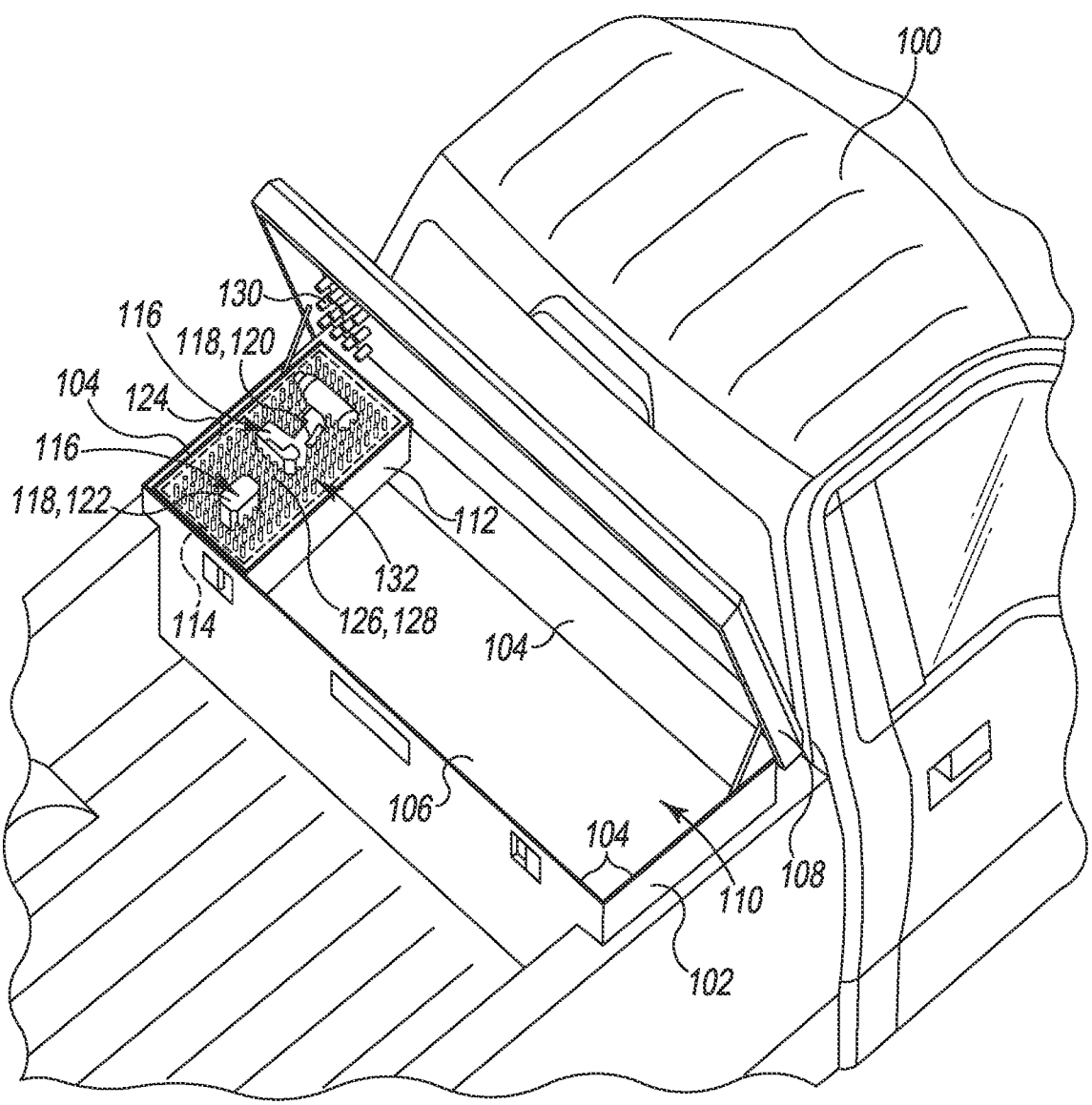
FIG. 1 is a perspective and diagrammatic view of a vehicle including an integrated tool storage container for wireless tool charging in accordance with the present disclosure.

A tool storage container 102 in accordance with the present disclosure is adapted for use with a vehicle 100 such as, for example, a vehicle 100 as shown in FIG. 1. The vehicle 100 is illustratively a light truck; however, in other embodiments the vehicle 100 may be a passenger car, a van, a sport utility vehicle, a heavy truck, or any other suitable vehicle. Similarly, the tool storage container 102 is illustratively a tool box mounted in a truck bed of the vehicle 100; however, in other embodiments the tool storage container 102 may be embodied as or included in a glove box, a trunk, a vehicle seat, an under-seat storage compartment, a map pocket, or any other compartment or other part of the vehicle 100.

Figure 2:
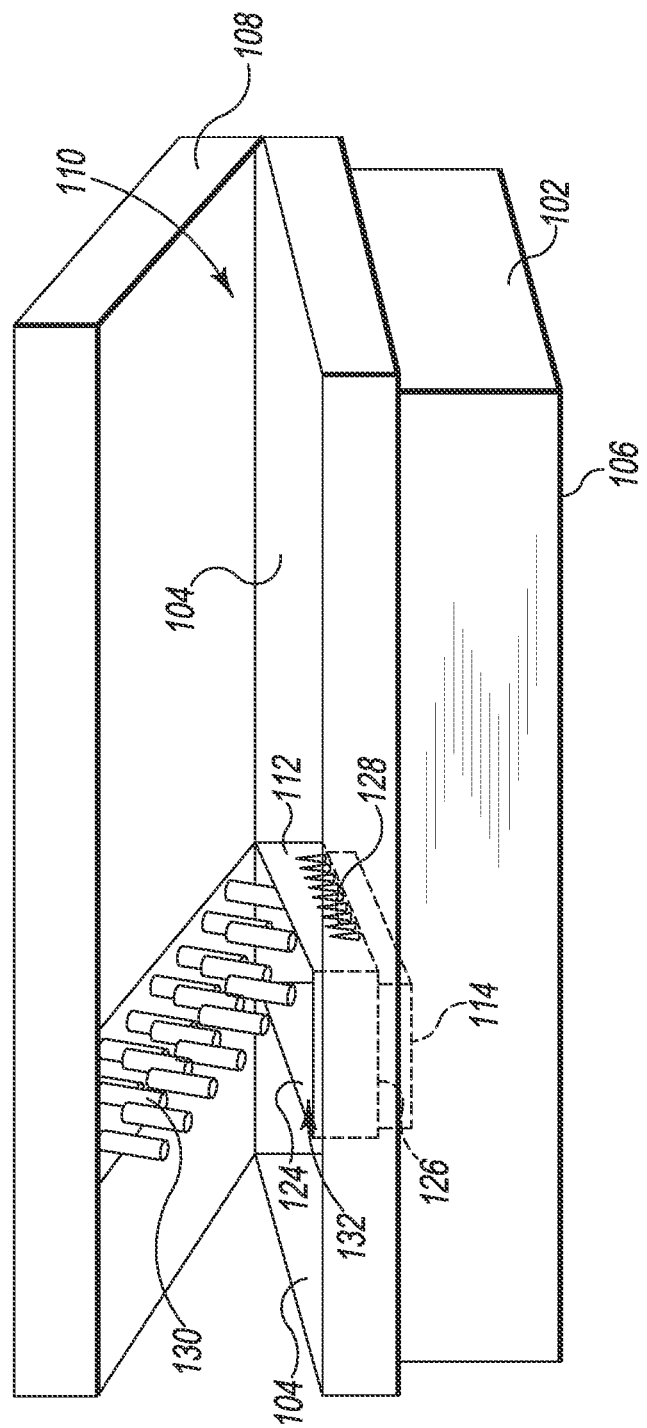
FIG. 2 is a perspective view of the tool storage container of FIG. 1.

As shown in FIGS. 1-2, the illustrative tool storage container 102 includes multiple side walls 104 surrounding a floor 106 and a hinged cover 108 attached to one of the side walls 104. The side walls 104, the floor 106, and the cover 108 define an interior 110, which includes one or more tool trays 112. As described further below, the tool tray 112 provides a location for storing and wirelessly charging tools, batteries, or other chargeable devices.

As shown in FIGS. 1-5, the tool tray 112 is coupled to a wireless charging transmitter 114. The wireless charging transmitter 114 is a resonant charger that may transmit energy wirelessly to one or more wireless charging receivers 116 that are positioned in the tool tray 112. In particular, the illustrative transmitter 114 includes a resonator (e.g., an inductor-capacitor circuit) tuned for a particular resonant frequency. Similarly, each receiver 116 includes a resonator tuned for that same resonant frequency. Each receiver 116 is in turn coupled to a device 118 that may be wirelessly charged or otherwise powered by energy received from the transmitter 114. For example, the device 118 may be embodied as a portable power tool 120 such as a drill, saw, hammer, flashlight, torch, or other electrically powered tool. As another example, the device 118 may be embodied as a removable battery 122, a battery charger, or any other energy storage device that may be wirelessly charged or otherwise powered.

The transmitter 114 is coupled to an electrical power system of the vehicle 100. For example, the transmitter 114 may receive electrical power from a DC power supply, an alternator, an inverter, a DC-DC converter, or other electrical power supply of the vehicle 100. When the transmitter 114 is energized, the transmitter 114 generates a magnetic field that oscillates at the resonant frequency of the transmitter 114. This oscillating magnetic field couples with each receiver 116 placed in the tool tray 112 and transfers energy that may be used to charge or otherwise power the coupled device 118. As a resonant charger, the transmitter 114 is capable of relatively high-powered charging of devices 118 as compared to typical inductive chargers. For example, in an embodiment the transmitter 114 may be capable of charging devices 118 at a rate of about 150 watts. Additionally, the transmitter 114 may be capable of providing energy to multiple receivers 116 simultaneously, such as between one to three receivers 116 simultaneously. As described further below, the tool tray 112 is adapted to receive and retain multiple devices 118 while they are being charged by the transmitter 114.

As discussed above, the storage container 102 includes a tool tray 112 positioned inside the storage container 102. The tool tray 112 includes multiple inner walls 124 that surround a floor 126. The transmitter 114 is coupled to the underside of the floor 126 of the tool tray 112 such that, when a device 118 including a receiver 116 is positioned in the tool tray 112 in any position and/or orientation, the receiver 116 may be charged by the transmitter 114. Although illustrated in FIGS. 1-2 as occupying part of the interior 110 of the tool storage container 102, it should be understood that in some embodiments, the tool tray 112 may extend through the entire interior 110 of the storage container 102. Additionally or alternatively, although illustrated as including a separate tool tray 112 positioned within the tool storage container 102, in some embodiments the tool storage container 102 and the tool tray 112 may be integrated. For example, in some embodiments, the transmitter 114 may be coupled to the floor 106 of the storage container 102, and one or more receivers 116 may be located in any position and/or orientation within the tool storage container 102.

The tool tray 112 further includes a removable tray liner 128. The tray liner 128 may be embodied as a brush pad that includes multiple, flexible fingers extending upward from the floor 126 of the tool tray 112. The tray liner 128 may be formed from silicone or another flexible and/or elastomeric material. When a device 118 including a receiver 116, such as a tool 120 or a battery 122, is placed on the tray liner 128, the flexible fingers of the brush pad conform to the shape of the device 118 and thus retain or otherwise secure the device 118 while the vehicle 100 is in motion. The tray liner 128 may also cushion road vibrations or otherwise retain the device 118. Additionally, when the device 118 is placed on the tray liner 128, the device 118 is positioned at a distance above the floor 126 of the tool tray 112. Thus, the device 118 may be positioned above any water, dirt, or other debris that may collect at the bottom of the tool tray 112. Additionally, and as described above, the tray liner 128 may be removed for cleaning or replacement.

As described above, the storage container 102 further includes a cover 108, and a cover liner 130 is coupled to the underside of the cover 108. The cover 108 is moveable from an open position, in which the interior 110 of the storage container 102 (including the tool tray 112) is accessible, to a closed position, in which the interior 110 of the storage container 102 (including the tool tray 112) is not accessible. Additionally, when the tool cover 114 is in the closed position, the storage container 102 may be water and/or dust resistant. Additionally or alternatively to the cover 108, in some embodiments the tool tray 112 may itself include a separate tool cover that is coupled to a cover liner 130.

The cover liner 130 may be embodied as a thermal conductive foam, such as a silicone foam. Such thermal conductive foam may be operable to assist in removing excess heat from one or more devices 118 as they are being charged within the tool tray 112. Additionally, in some embodiments, the cover liner 130 may include multiple, flexible fingers that, when in the closed position, extend inward from the cover 108 toward the tray liner 128. When the cover 108 is in the closed position, the fingers of the cover liner 130 may contact each device 118 stored in the tool tray 112 and thereby secure each device 118 while the vehicle 100 is in motion. As shown in FIGS. 1-2, in the illustrative embodiment, the flexible fingers of the cover liner 130 may be larger (e.g., larger in diameter and/or length) as compared to the flexible fingers of the tray liner 128.

In the closed position, the cover 108 and the tool tray 112 cooperate to define a charging volume 132. As described above, the tray liner 128 and the cover liner 130 surround the charging volume 132. When the cover 108 is in the closed position, the tray liner 128 and the cover liner 130 may contact any tools 120, batteries 122, or other devices 118 positioned within the charging volume 132 and retain those devices 118 in position. Thus, the charging volume 132 is configured to receive and retain one or more tools 120, batteries 122, or other devices 118. When such devices 118 are positioned within the charging volume 132, they may be wirelessly charged by the transmitter 114.

As described above, the transmitter 114 is a resonant transmitter.

Figure 3:
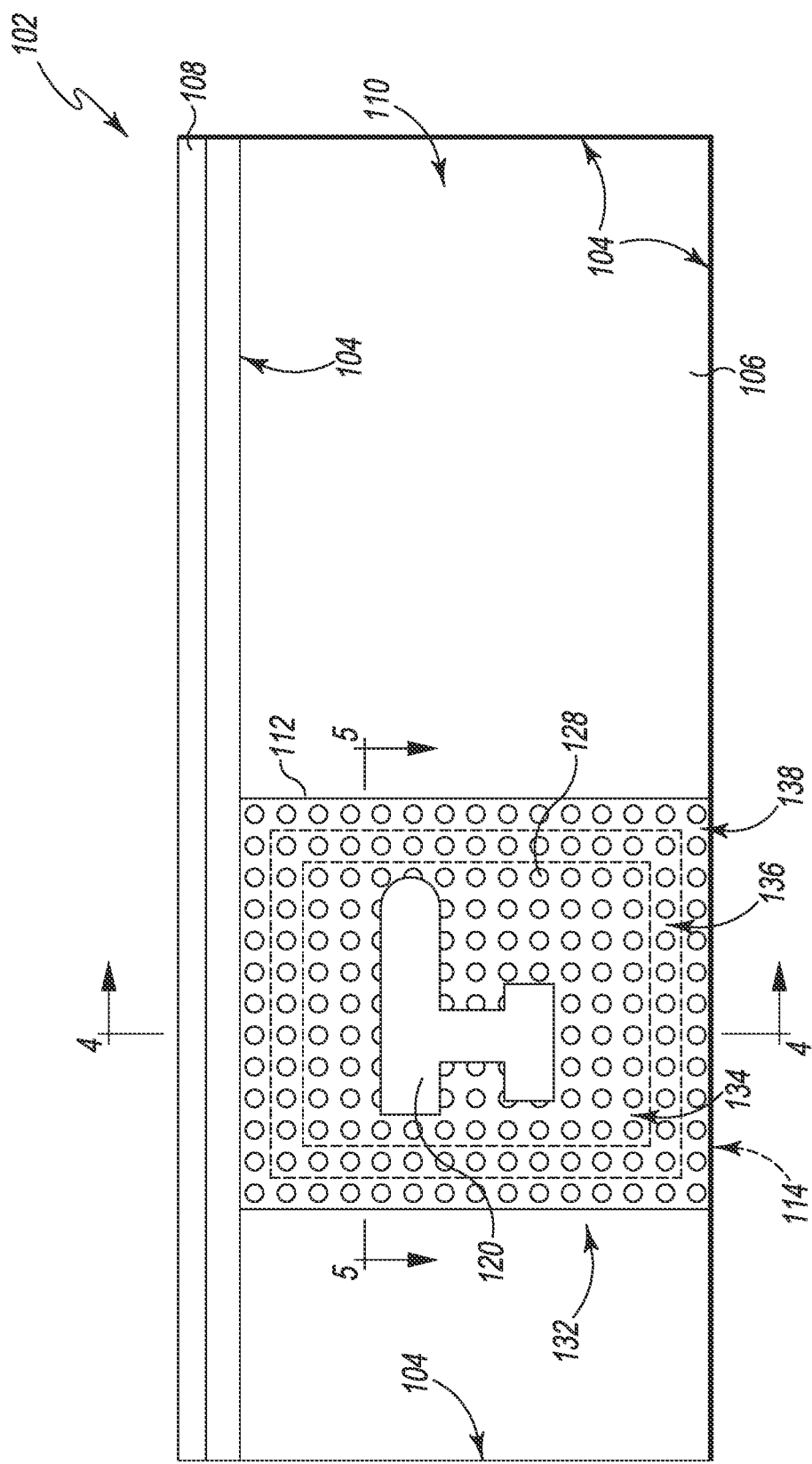
FIG. 3 is an elevation view of the tool storage container of FIGS. 1 and 2.

Accordingly, and as opposed to inductive wireless charging systems, each receiver 116 coupled to a device 118 may not be required to be in any particular, predetermined position and/or alignment relative to the transmitter 114 during charging. Thus, the storage container 102 and tool tray 112 may allow for convenient "throw and go" high-power charging of wireless devices 118, without requiring that the devices 118 be stored in any particular arrangement within the tool tray 112. For example, a tool 120 may be positioned horizontally within the tool tray 112 as shown in FIGS. 3-5, or vertically, or in any other orientation within the tool tray 112

Although no particular alignment is required to perform wireless charging, in some embodiments charging power and/or charging efficiency may be improved if each receiver 116 is positioned closer to a central part of the transmitter 114. As shown in FIGS. 3-5, the tray liner 128 may include a central area 134 positioned toward the center of the tool tray 112, as well as a middle area 136 surrounding the central area 134 and an outer area 138 surrounding the middle area 136. The central area 134 may thus also be positioned over the central part of the transmitter 114. As shown in FIGS. 4 and 5, the flexible fingers of the tray liner 128 within the central area 134 extend a height 140 above the floor 126 of the tool tray 112. The flexible fingers within the middle area 136 extend a height 142 above the floor 126 of the tool tray 112 that is larger than the height 140, and the flexible fingers within the outer area 138 extend a height 144 above the floor 126 of the tool tray 112 that is larger than the height 142. Thus, when a device 118 is positioned on the tray liner 128, the increasing heights 140, 142, 144 may tend to position the device 118 toward the central area 134 (having the lowest height 140) and thus toward the center of the transmitter 114. Therefore, charging power and/or charging efficiency may be improved as compared to when the device 118 is positioned toward the middle area 136 and/or the outer area 138. Additionally or alternatively, although illustrated as including a central area 134, a middle area 136, and an outer area 138, it should be understood that in other embodiments the tray liner 128 may include a different number and/or arrangement of areas having different heights. In each embodiment, the flexible fingers of the tray liner 128 may have a smaller height closer to the center of the tray liner 112.

Figure 4:
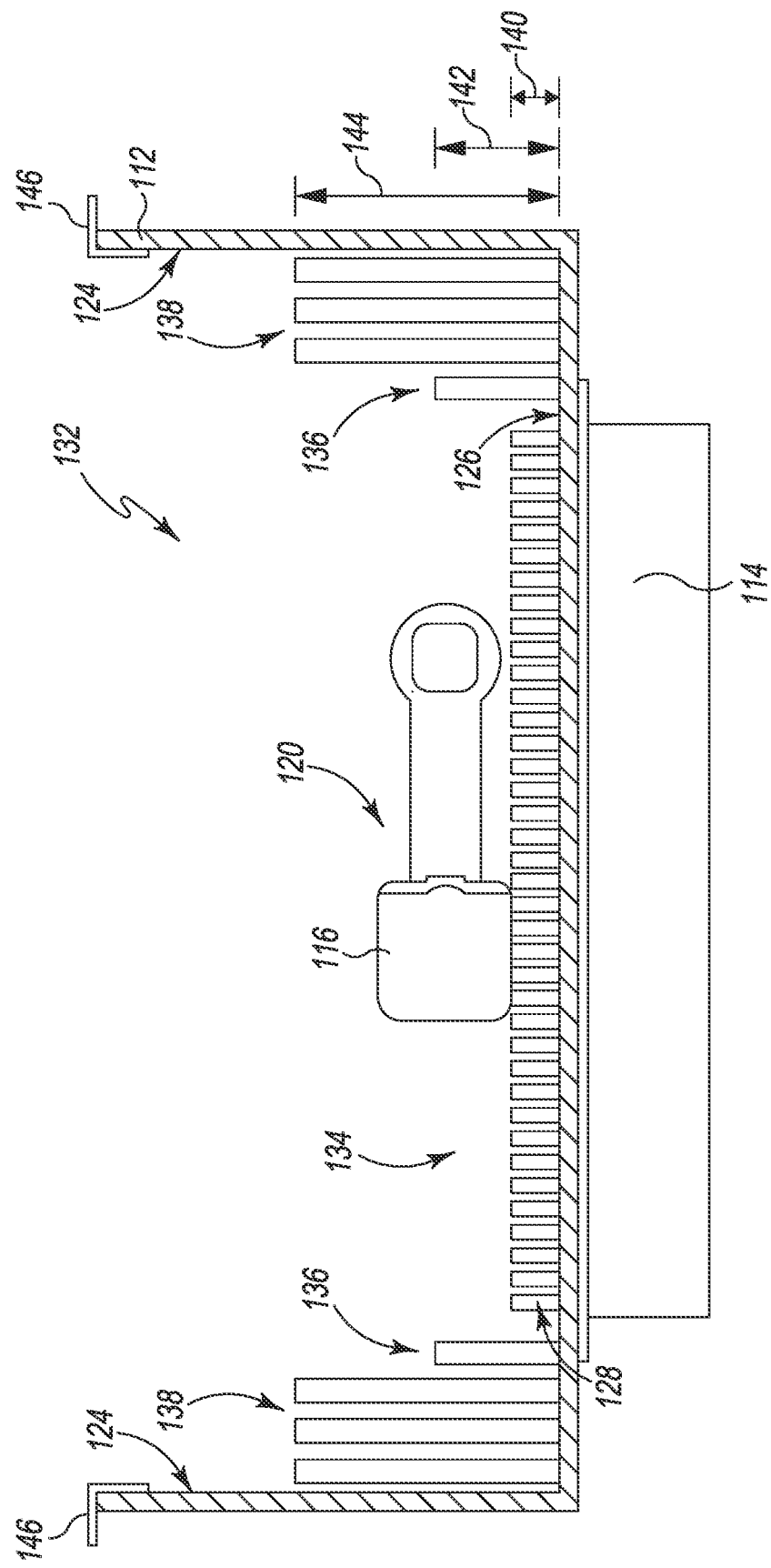
FIGS. 4-5 are cross-sectional elevation views of the tool storage container of FIGS. 1-3.
Figure 5:
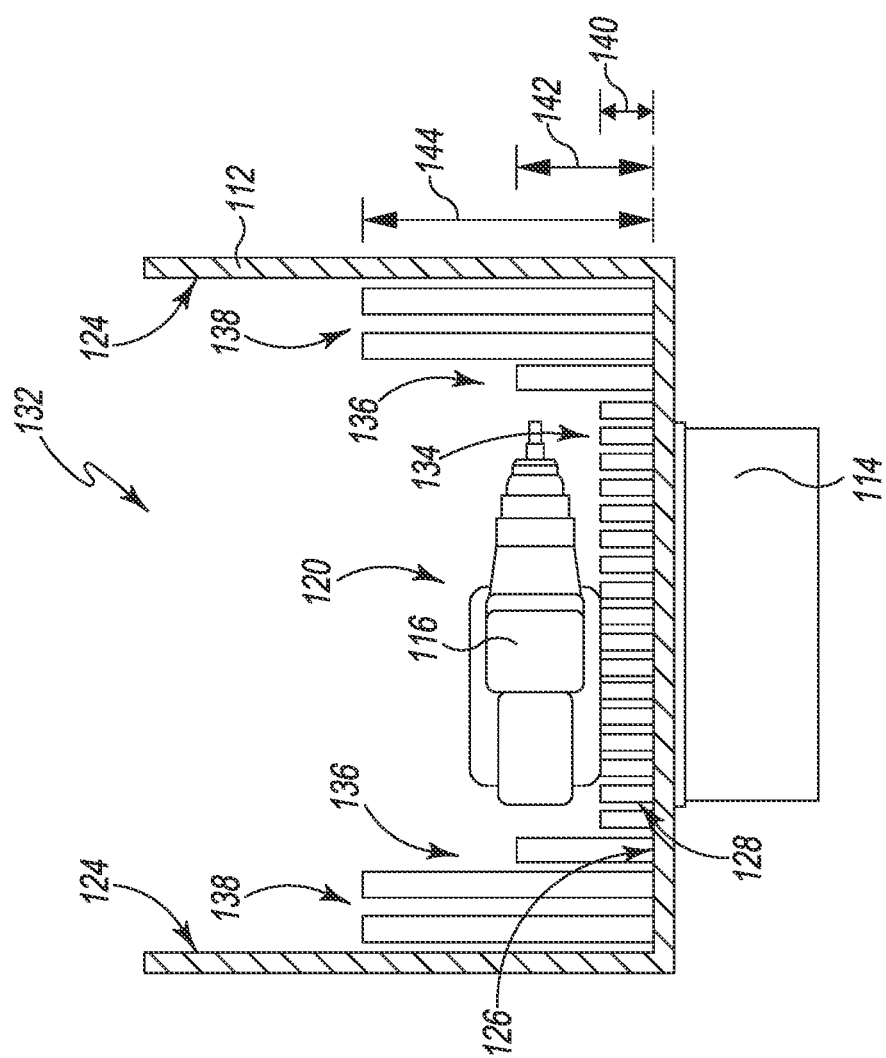

As shown in FIG. 4, the tool tray 112 may further include a pair of tabs 146 that extend outward from the inner walls 124 of the tool tray 112. When the tool tray 112 is inserted in the interior 110 of the storage container 102, the tabs 146 may be attached to the side walls 104. Thus, the tool tray 112 may be secured within the storage container 102.

In the illustrative embodiment, the tray liner 128 is removably coupled to the tool tray 112 and the cover liner 130 is coupled to the cover 108. However, it should be understood that in some embodiments those components and/or the features of those components may be reversed. For example, in some embodiments, the tray liner 128 may be embodied as thermal conductive foam and the cover liner 130 may be embodied as a silicone brush pad.

The following numbered clauses include embodiments that are contemplated and non-limiting:

Clause 1. A tool container for wirelessly charging tools, the tool container comprising
a wireless charging transmitter;
a tool tray coupled to the wireless charging transmitter; and
a tool tray liner removably coupled to the tool tray, wherein the tool tray liner comprises a flexible brush pad.

Clause 2. The tool container of clause 1, any other clause, or combination of clauses, further comprising a tool cover coupled to the tool tray, wherein the tool cover is moveable between a closed position and an open position, and wherein when the tool cover is in the closed position the tool tray liner and the tool cover define a charging volume configured to retain a device comprising a wireless charging receiver for charging by the wireless charging transmitter.

Clause 3. The tool container of clause 2, any other clause, or combination of clauses, further comprising thermal conductive foam coupled to the tool cover, wherein when the tool cover is in the closed position the thermal conductive foam and the tool tray liner define the charging volume.

Clause 4. The tool container of clause 3, any other clause, or combination of clauses, wherein the thermal conductive foam comprises a silicone material.

Clause 5. The tool container of clause 4, any other clause, or combination of clauses, wherein the tool tray liner comprises a silicone material.

Clause 6. The tool container of clause 5, any other clause, or combination of clauses, wherein the tool tray liner comprises a plurality of flexible fingers that extend from the tool tray toward the charging volume.

Clause 7. The tool container of clause 6, any other clause, or combination of clauses, wherein
the tool tray liner comprises a first area positioned at a central part of the tool tray and a second area surrounding the first area, wherein the central part of the tool tray is positioned opposite a central part of the wireless charging transmitter; and
the flexible fingers of the first area extend a first height from the tool tray, and the flexible fingers of the second area extend a second height from the tool tray, wherein the second height is larger than the first height.

Clause 8. The tool container of clause 7, any other clause, or combination of clauses, wherein the tool tray liner comprises a third area surrounding the second area, the flexible fingers of the third area extending a third eight from the tool tray, the third height larger than the first height.

Clause 9. The tool container of clause 8, any other clause, or combination of clauses, wherein the wireless charging transmitter is configured to receive electrical power from a vehicle power supply.

Clause 10. The tool container of clause 9, wherein the tool container is configured to be mounted to a vehicle.

Clause 11. The tool container of clause 10, wherein the device comprises a wireless power tool or a rechargeable battery.

Clause 12. The tool container of clause 11, wherein the wireless charging transmitter comprises a resonant charging transmitter.

Clause 13. The tool container of clause 12, wherein:
the wireless charging transmitter comprises a first resonator having a first resonant frequency; and
the wireless charging receiver comprises a second resonator having the first resonant frequency.

The invention claimed is:

1. A tool container for wirelessly charging tools, the tool container comprising:
a wireless charging transmitter;
a tool tray coupled to the wireless charging transmitter;
a tool tray liner removably coupled to the tool tray, wherein the tool tray liner comprises a flexible brush pad; and
a tool cover coupled to the tool tray, wherein the tool cover is moveable between a closed position and an open position, and wherein when the tool cover is in the closed position the tool tray liner and the tool cover define a charging volume configured to retain a device comprising a wireless charging receiver for charging by the wireless charging transmitter;
wherein the tool tray liner comprises a plurality of flexible fingers that extend from the tool tray toward the charging volume, and further comprises a first area positioned at a central part of the tool tray and a second area surrounding the first area, wherein the central part of the tool tray is positioned opposite a central part of the wireless charging transmitter; and
wherein the flexible fingers of the first area extend a first height from the tool tray, and the flexible fingers of the second area extend a second height from the tool tray, wherein the second height is larger than the first height.

2. The tool container of claim 1, further comprising thermal conductive foam coupled to the tool cover, wherein when the tool cover is in the closed position the thermal conductive foam and the tool tray liner define the charging volume.

3. The tool container of claim 2, wherein the thermal conductive foam comprises a silicone material.

4. The tool container of claim 1, wherein the tool tray liner comprises a silicone material.

5. The tool container of claim 1, wherein the tool tray liner comprises a third area surrounding the second area, the flexible fingers of the third area extending a third eight from the tool tray, the third height larger than the first height.

6. The tool container of claim 1, wherein the wireless charging transmitter is configured to receive electrical power from a vehicle power supply.

7. The tool container of claim 1, wherein the tool container is configured to be mounted to a vehicle.

8. The tool container of claim 1, wherein the device comprises a wireless power tool or a rechargeable battery.

9. The tool container of claim 1, wherein the wireless charging transmitter comprises a resonant charging transmitter.

10. The tool container of claim 9, wherein:
the wireless charging transmitter comprises a first resonator having a first resonant frequency; and the wireless charging receiver comprises a second resonator having the first resonant frequency.

* * * * *